Nov. 7, 1961 E. BERTULLI 3,007,179
STRAINER
Filed Oct. 30, 1959 2 Sheets-Sheet 1
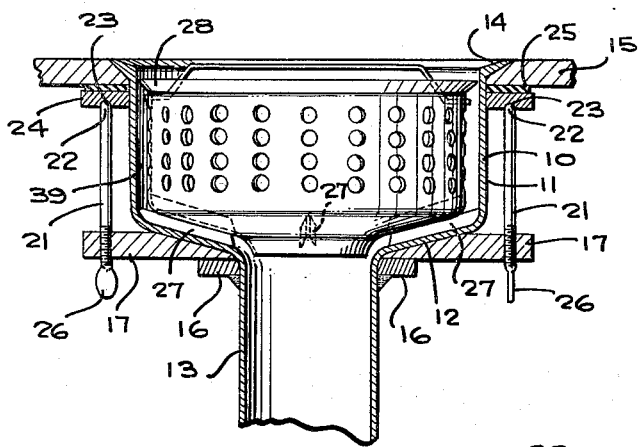
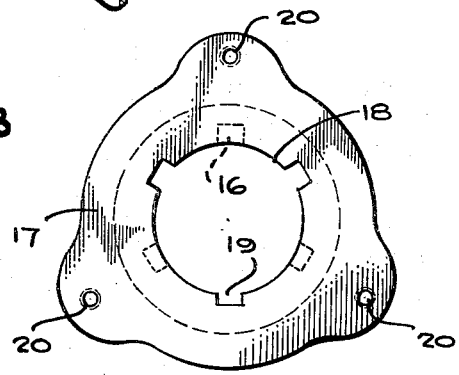
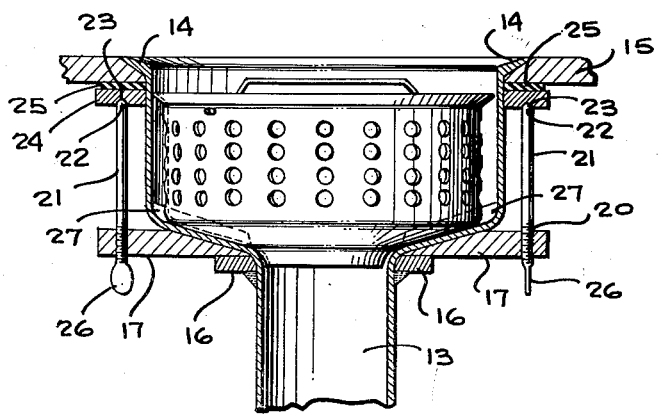
INVENTOR.
ERMETE BERTULLI
BY
ATTORNEYS Nov. 7, 1961  E. BERTULLI  3,007,179
STRAINER Filed Oct. 30, 1959  2 Sheets-Sheet 2

INVENTOR.
ERMETE BERTULLI
BY
Stevens Davis Miller & Mosher
ATTORNEYS

United States Patent Office 3,007,179
Patented Nov. 7, 1961

3,007,179
STRAINER
Ermete Bertulli, 428 Davis St., Port Colborne,
Ontario, Canada
Filed Oct. 30, 1959, Ser. No. 849,961
Claims priority, application Canada May 4, 1959
6 Claims. (Cl. 4—287)

This invention is concerned with a strainer and more particularly with a strainer for installation under a sink, or laundry tub.

The strainers now used are unnecessarily complex in structure and are difficult to install. Conventional strainers involve a receptacle which is secured to the sink by a large nut and fibre washer. A tail piece is secured to the strainer such as by a gasket and slip nut. The basket is mounted on a central guide post which has provision for maintaining the basket in a position in which the outlet to the sink will be blocked or alternatively in a position in which water will flow through the basket into the tail piece.

Strainers of this conventional construction are difficult to install and to servie and are also difficult to clean.

The object of this invention is to provide a strainer of improved construction which can more readily be installed and serviced than conventional strainers which is easier to clean because of its simplified structure and its absence of difficultly accessible moving parts and which efficiently performs its intended purpose.

In accordance with this invention, a strainer is provided comprising a cup-shaped receptacle and tail piece, an annular flange formed at the upper edge of the cup-shaped receptacle for engagement with the sink, clamping means comprising a lower clamping ring separably secured to the cup-shaped receptacle and tail piece assembly, an upper clamping ring encircling said cup-shaped receptacle and tightening means connected to said upper and lower clamping rings to cause the edge of the waste outlet of the sink to which said strainer is secured to be clamped between said annular flange and said upper clamping ring, a basket disposed in said receptacle and means for maintaining said basket alternatively in a position in which it blocks the connection between said receptacle and said tail piece and a position in which it permits filtered liquid to flow from said receptacle into said tail piece.

In the drawings which illustrate the preferred embodiment of this invention.

FIG. 1 is a sectional elevation view of the strainer showing the basket positioned to permit liquid in the sink to flow into the tail piece.

FIG. 2 is a view similar to FIG. 1 but showing the basket positioned to block the outlet between the receptacle and the tail piece.

FIG. 3 is a detailed bottom plan view of the lower clamping ring shown in FIGS. 1 and 2.

Figure 4:
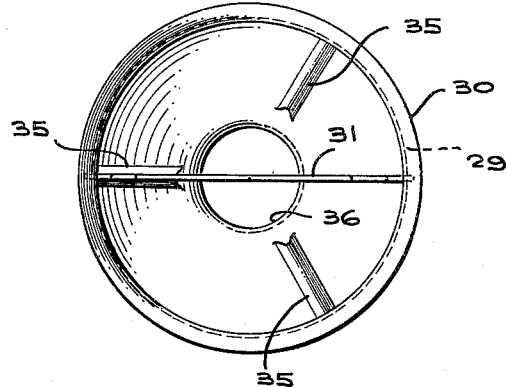
FIG. 4 is a detailed plan view of the basket shown in FIGS. 1 and 2.

Referring now to FIG. 1 of the drawings, the strainer comprises a cup-shaped receptacle 10 having side walls 11 and a sloping bottom wall 12 leading to a tail piece 13 which is integrally formed with cup-shaped receptacle 10. At the upper edge of cup-shaped receptacle 10 there is an integrally formed annular flange 14 providing a lip to engage the edge of the waste outlet of the sink 15. Lugs 16 which are illustrated as being three in number are secured to tail piece 13 at the junction between tail piece 13 and receptacle 10. Lugs 16 support a lower clamping ring 17 which is shown in detail in FIG. 3. Clamping ring 17 has an aperture 18 to receive tail piece 13. Aperture 18 is shaped to provide indentations 19 conforming with lugs 16 so that lower clamping ring 17 can be moved into position from beneath the strainer with lugs 16 passing through indentations 19. Lower clamping ring 17 is then given a partial rotation as best indicated in FIG. 3 so that lugs 16 will be out of register with indentations 19. Lower clamping ring 17 has threaded holes 20 which may conveniently be three in number for the reception of bolts 21 which provide a tightening means. The upper ends 22 of bolts 21 engage recesses or guide holes 23 in an annular shaped upper clamping ring 24. A washer which may be a rubber washer 25 is preferably inserted between upper clamping ring 24 and sink 15. When bolts 21 are tightened, upper clamping ring 24 and flange 14 firmly engage and secure the strainer to sink 15. It will be appreciated that as the assembly or servicing of the strainer does not involve the manipulation of a large clamping nut, these operations may be carried out far more easily than in conventional constructions using an ordinary small sized wrench to turn the flattened head 26 of bolts 21.

Figure 5:
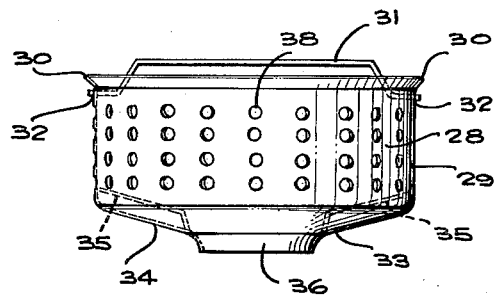
FIG. 5 is an elevation view of the basket shown in FIG. 4.
Figure 6:
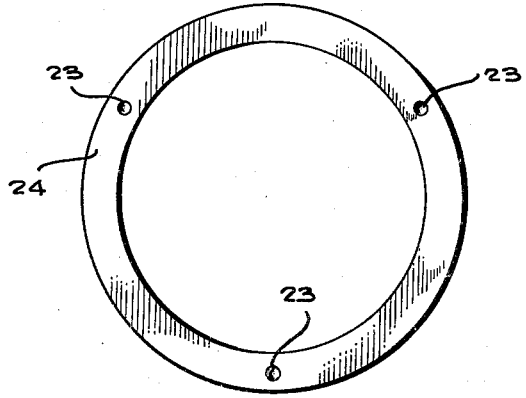
FIG. 6 is a detailed plan view of the upper clamping ring shown in FIGS. 1 and 2.

The inner surface of the bottom 12 of the receptacle is fitted with upraised ribs 27 which are illustrated as being three in number. As illustrated in FIG. 1 ribs 27 support a basket 28 which is shown in detail in FIGS. 4 and 5. Basket 28 comprises an apertured side wall member 29 at the top of which is a locating flange 30 to maintain apertured side wall 29 spaced from the side wall 11 of receptacle 10. A handle 31 is fitted into aperture 32 in side wall 29. Basket 28 also comprises a base 33 having a sloping portion 34 conforming with portion 12 of receptacle 10 and having recesses 35 conforming with ribs 27, and a plug portion 36 for blocking off the passage of liquid into tail piece 13. When the basket is positioned as shown in FIG. 1 with recesses 35 out of register with ribs 27, liquid from the sink flows through aperture 38 in apertured side wall 29 down through the passage 39 between side walls 11 and 28 between ribs 27 and into tail piece 13. When the basket is positioned as shown in FIG. 2 with ribs 27 fitting into recesses 35, the passage of liquid between the interior of receptacle 10 and tail piece 13 is blocked as best illustrated in FIG. 2.

I claim:

1. A strainer comprising a cup-shaped receptacle and tail piece, an annular flange formed at the upper edge of said cup-shaped receptacle for overlapping engagement with the edge of the waste outlet of a sink, a plurality of spaced lugs extending outwardly adjacent to the junction of said cup-shaped receptacle and said tail piece, a lower clamping ring encircling said cup-shaped receptacle and tail piece assembly adjacent to said junction, said lower clamping ring being formed to provide inwardly directed indentations conforming with said lugs to provide a separable securing means of the lower clamping ring with said assembly adapted to permit the lower clamping ring to be engaged with said assembly by sliding said lower clamping ring upwardly with said lugs in alignment with said indentations and turning said lower clamping ring to a portion in which said lugs are out of register with said indentations, an upper clamping ring encircling and slidably engaging said cup-shaped receptacle and tightening means connecting said lower clamping ring and said upper clamping ring to cause the edge of the waste outlet of the sink to be clamped between said annular flange and upper clamping ring, a basket disposed in said cup shaped receptacle and means for maintaining said basket alternatively in a position in which it blocks the connection between said receptacle and said tail piece and in a position in which it permits filtered liquid to flow from said receptacle into said tail piece.

2. A strainer as in claim 1 in which said tail piece is permanently secured to said receptacle.

3. A strainer as in claim 1 in which said tightening means comprises a plurality of bolts threadably engaging said lower clamping ring and bearing on said upper clamping ring.

4. A strainer as in claim 3 in which said upper clamping ring is formed to provide downwardly facing recess means to receive the upper ends of said bolts.

5. A strainer as in claim 1 in which an annular sealing ring is interposed between the upper surface of said upper clamping ring and the edge of the waste outlet of said sink.

6. A fitting for the waste outlet of a sink comprising cup-shaped receptacle and tail piece, an annular flange formed at the upper edge of said cup-shaped receptacle for overlapping engagement with the edge of the waste outlet of a sink, a plurality of spaced lugs extending outwardly adjacent to the junction of said cup-shaped receptacle and said tail piece, a lower clamping ring encircling said cup-shaped receptacle and tail piece assembly adjacent to said junction, said lower clamping ring being formed to provide inwardly directed indentations conforming with said lugs to provide a separable securing means of the lower clamping ring with said assembly adapted to permit the lower clamping ring to be engaged with said assembly by sliding said lower clamping ring upwardly with said lugs in alignment with said indentations and turning said lower clamping ring to a portion in which said lugs are out of register with said indentations, an upper clamping ring encircling and slidably engaging said cup-shaped receptacle and tightening means connecting said lower clamping ring and said upper clamping ring to cause the edge of the waste outlet of the sink to be clamped between said annular flange and upper clamping ring.

References Cited in the file of this patent

UNITED STATES PATENTS

| | | |
|---|---|---|
| 1,704,529 | Brotz | Mar. 5, 1929 |
| 2,225,693 | Frances | Dec. 24, 1940 |
| 2,707,287 | Hiertz | May 3, 1955 |
| 2,736,577 | Mackey | Feb. 28, 1956 |

Notice of Adverse Decision in Interference

In Interference No. 92,542 involving Patent No. 3,007,179, E. Bertulli, Strainer, final decision adverse to the patentee was rendered Apr. 30, 1963, as to claims 1, 2, 3, 4, 5 and 6.

[*Official Gazette July 23, 1963.*]